INVENTOR
Ralph W. George
BY
ATTORNEY

April 30, 1946.   R. W. GEORGE   2,399,481
ULTRA HIGH FREQUENCY SYSTEM
Filed Aug. 28, 1941   2 Sheets-Sheet 2
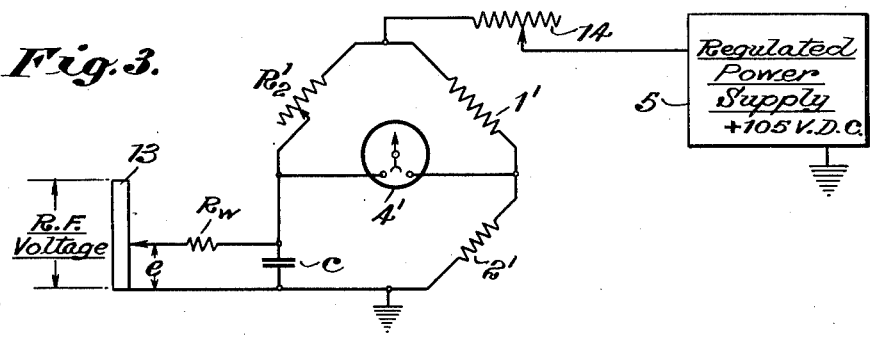
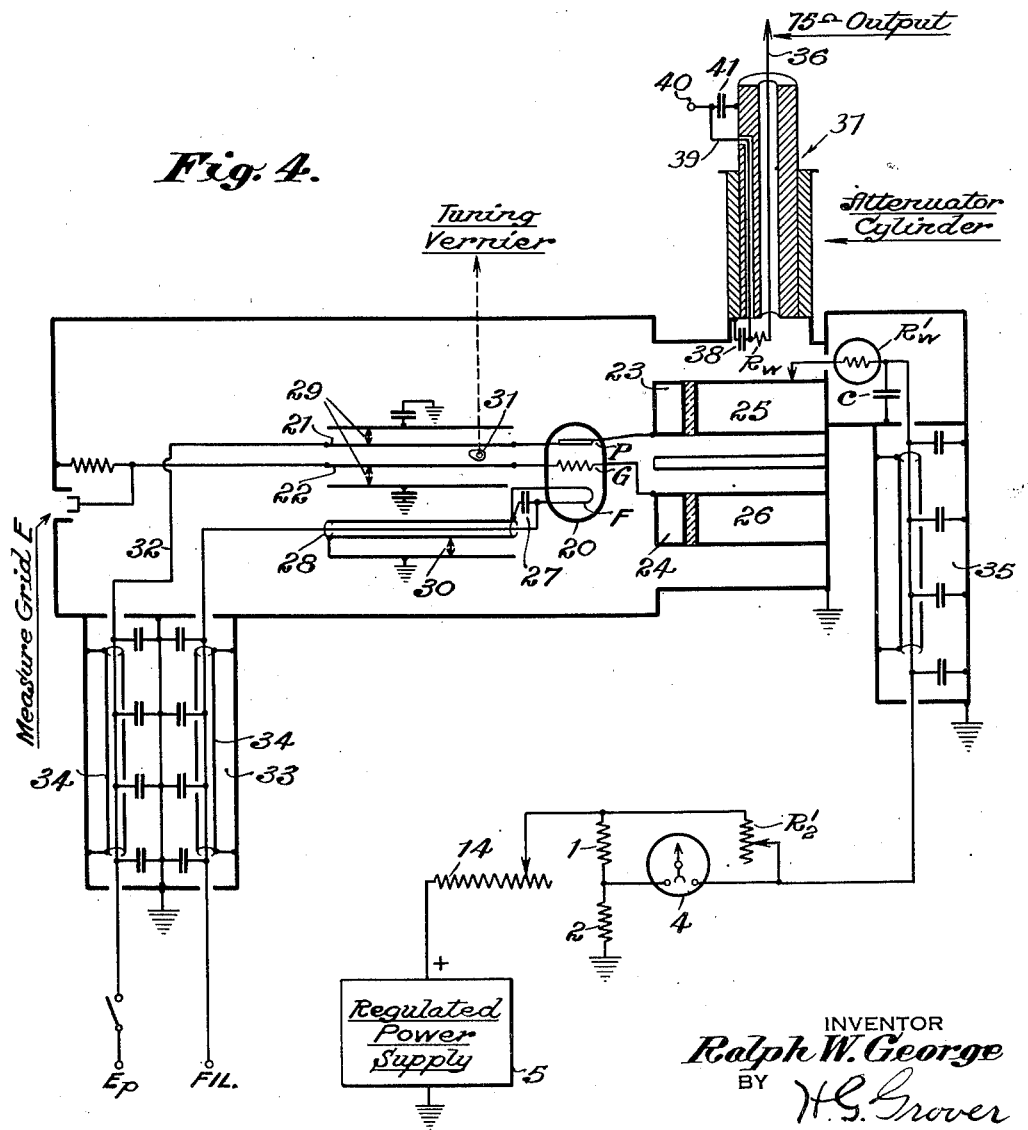
INVENTOR
Ralph W. George
BY H. G. Grover
ATTORNEY Patented Apr. 30, 1946

2,399,481

UNITED STATES PATENT OFFICE 2,399,481

ULTRA HIGH FREQUENCY SYSTEM

Ralph W. George, Riverhead, N. Y., assignor to Radio Corporation of America, a corporation of Delaware Application August 28, 1941, Serial No. 408,570

22 Claims. (Cl. 171—95)

This invention relates to a measuring system for use particularly at ultra high frequencies above 100 megacycles.

One of the objects of the present invention is to enable the measurement of power, voltage or current with improved accuracy at frequencies of the order of 500 megacycles to frequencies up to several thousand megacycles.

Another object is to provide an improved bolometer measuring system employing a Wollaston wire of such fineness that it has the same resistance at radio frequencies as with direct current flowing therethrough, and which is heated by radio frequency current. This wire may or may not comprise a part of the radio frequency utilization circuit.

A further object is to provide an ultra high frequency voltage or current indicator in the form of a Wollaston wire connected in a bridge circuit which can be used at frequencies up to or above several thousand megacycles.

A still further object is to provide a signal generator having an output circuit whose internal impedance is primarily determined by a Wollaston wire resistance. This Wollaston wire can be used as an iductive coupling loop in a mutual inductance type attenuator and also used in my improved measuring sytem to determine the magnitude of output of the signal generator.

A more detailed description of the invention follows in conjunction with a drawing, wherein like parts are designated by like reference characters.

In the drawings:

Fig. 3 illustrates another embodiment of my present invention employing a voltage or current indicator in the form of a Wollaston wire connected in a bridge circuit; and Fig. 4 shows my improved type of signal generator utilizing a Wollaston wire in the output attenuator circuit, and employing a voltage or current indicator in the form of a Wollaston wire in a bridge circuit.

Figure 1:
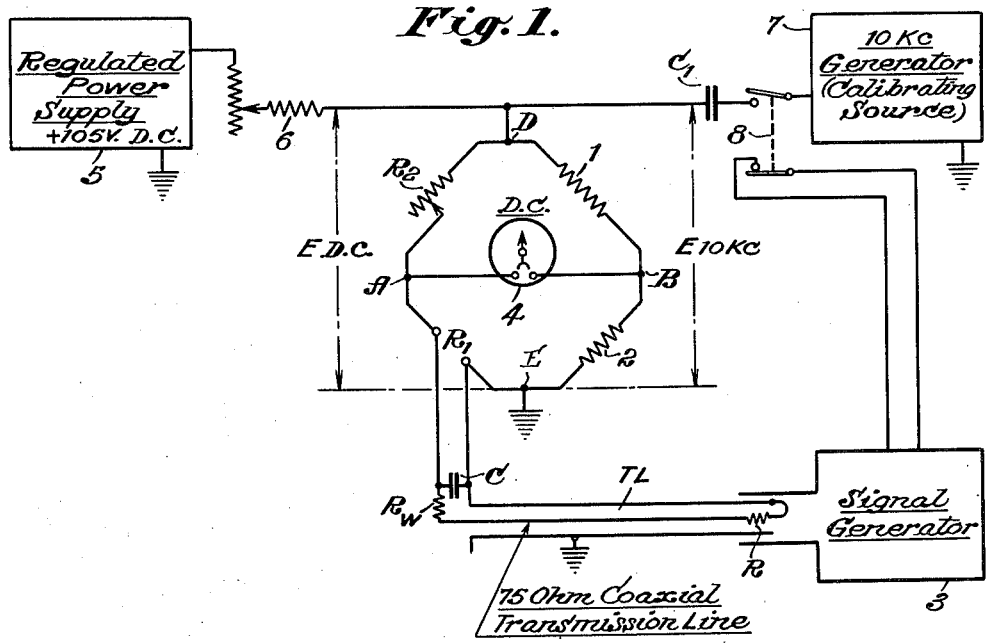
Figs. 1 and 2 show two different embodiments of my improved measuring system employing a Wollaston wire which is heated by radio frequency current passing therethrough.

Referring to Fig. 1, there is shown a voltage measuring system having a bridge circuit whose arms are 1, 2, $R_2$ and $R_1$. Arm $R_1$ is composed of two resistances, $R_w$ in the form of a Wollaston wire and R in series, the latter being the internal resistance of the output circuit of the signal generator 3. The Wollaston wire $R_w$ and the resistor R are connected in series through a 75 ohm coaxial transmission line TL. The resistor R is chosen to be 75 ohms in this particular embodiment, while resistance $R_w$ is a platinum wire on the order of .1 mil thickness and about one-eighth inch long, having a resistance slightly less than 75 ohms at room temperature, let us say on the order of 73 ohms. The skin effect of this Wollaston wire is negligible at very high frequencies for which reason the resistance at these frequencies is the same as the direct current resistance of the wire. The element $R_w$ is designed to have a fairly low reactance to resistance ratio, in order to minimize errors due to reactance in the termination for line TL. The signal generator 3 may, if desired, be generally of the type shown in my Patent 2,204,179, except that the attenuator is provided with a single resistor for unbalanced output instead of two resistors for balanced output. Resistor $R_2$ is a variable affair, preferably in the form of a decade box. A bridge balance indicator in the form of a direct current galvanometer 4 is connected across points A and B of the bridge circuit. Connected to point D of the bridge circuit there is provided a suitable source of direct current voltage obtained from a regulated power supply 5 for direct current excitation of the bridge. The adjustment of the voltage from power supply 5 permits the adjustment of the value of the effective resistance of wire $R_w$. A suitable resistance or inductance 6 in series with the direct current supply from equipment 5 serves to prevent the direct current source from presenting a low impedance to a calibrating voltage source 7 which is adapted to be connected to the same point D on the bridge. A connection from ground extends to point E. The term "ground" is here used to designate any point of zero or fixed alternating or radio frequency potential. Source 7 is a generator of suitable frequency, here shown, for example, as 10 kilocycles, of a frequency high enough to prevent change in heating of the Wollaston wire $R_w$ over the current cycle. From a practical standpoint, the frequency of the known voltage calibrating source 7 must be over 1000 cycles for this particular size of platinum wire of .1 mil in air. For other size Wollaston wires, the lowest limiting frequency permissible for the calibrating source 7 can be determined by the diameter of the wire $R_w$, or by experiment. The condenser C connected in shunt to the arm $R_1$ must have negligible impedance at the signal generator radio frequency and relatively high impedance at the frequency used in calibrating, that is, at the frequency of source 7. The condenser $C_1$ is merely a coupling capacitor for source 7. A switch 8 serves to connect the source 7 to the bridge at point D or, alternatively, to close a circuit for enabling the signal generator 3 to be energized in a quick and efficient manner.

From the foregoing, it will be seen that the output of the signal generator 3 is terminated by the resistance $R_w$. Since the source impedance R is 75 ohms, the transmission line TL (if not exactly one-half wavelength long electrically) must have a characteristic impedance of 75 ohms, and the terminating resistance $R_w$ must also be approximately 75 ohms and of negligible reactance. The transmission line TL must have negligible loss and the reactance in the sending and receiving end terminating resistors R and $R_w$ comprising the arm $R_1$ must also be negligible. From a practical standpoint the foregoing requirements for the 75 ohm resistance R are, in a conventional unit, satisfied at frequencies up to 500 or 600 megacycles, although above these frequencies errors in measurement increase due to reactance and resistance change at ultra high frequencies in such conventional units. It will be apparent that the value of resistance R will not change appreciably compared with the change in $R_w$ when the same current is passed through the two resistors in series.

Assuming that it is desired to measure the output of the signal generator 3, then we must know the value of the resistances in the bridge arms which must be constant for frequencies up to and including the calibrating frequency. Assuming a twenty-to-one fixed ratio between the upper and lower arms 1 and 2, it will be obvious that when the bridge is balanced the resistance in $R_2$ (decade box) will be twenty times the resistance in $R_1$, the latter being equal to the sum of $R_w$ and R. Inasmuch as $R_w$ and R should be 150 ohms, to obtain a perfect balance, then $R_2$ will be 3000 ohms. As previously stated, $R_w$ when cold is less than 75 ohms. The reason for this is that it permits the bridge to be energized or polarized by the voltage from the regulated power supply 5, here indicated by $E_{dc}$ across the bridge, with a resulting direct current in $R_w$, which by adjustment can bring the resistance of $R_w$ up to 75 ohms, a condition which will be indicated by the bridge balance instrument 4. When the bridge is balanced with the signal generator 3 effectively energized and the switch 8 in the position shown, it will be evident that the radio frequency power in $R_w$ is causing a slight increase in resistance of this wire. We can now determine the amount of power delivered by the signal generator 3 to the wire $R_w$ which increases its resistance to the extent necessary to balance the bridge. This determination is obtained by de-energizing the signal generator 3 and by substituting for the power from the signal generator, equal power in the wire $R_w$ from the known voltage calibrating source 7. The switch 8 serves to disconnect the signal generator and to couple the calibrating source 7 to the bridge by throwing switch 8 in a downward position. By varying the known voltage source 7 until the bridge is again balanced, we will know that we now have the same power in $R_w$ from the source 7 that we had before from the signal generator 3. Knowing the voltage from source 7, here indicated by $E_{1akc}$, it is a simple matter to determine the calibrating voltage across $R_w$. As an example; if the required calibrating voltage $E_{R_1}$ is .1 volt, it will be necessary for $E_{10kc}$ across the bridge to be twenty-one times $E_{R_1}$ or 2.1 volts. This is a magnitude readily measured with reference to a thermal type voltmeter across the calibrating source. Conversely, knowing that the required calibrating voltage $E_{10kc}$ is 2.1 volts, then we calculate the voltage across $R_1$ to be $$\frac{2.1}{21}$$

or .1 volt. This is equal the radio frequency voltage in series with $R_w$ and R. It follows that the radio frequency voltage across $R_w$ is one-half of the series or induced voltage and thus is .05 volt. Since the resistance of $R_w$ is accurately known, we can easily calculate the radio frequency power in $R_w$ from the formula Power in watts equals $$\frac{E^2}{R}$$

or $I^2R$, it being known that the current I is obtainable from the formula $$I = \frac{E}{R}$$

At this time it should be understood that the voltage delivered from the regulated power supply may be any suitable value. This value in one embodiment tried out in practice was 105 volts, merely because this magnitude of voltage happened to be the output of the particular power supply equipment then available. Obviously, lower values of voltage can be used.

Figure 2:
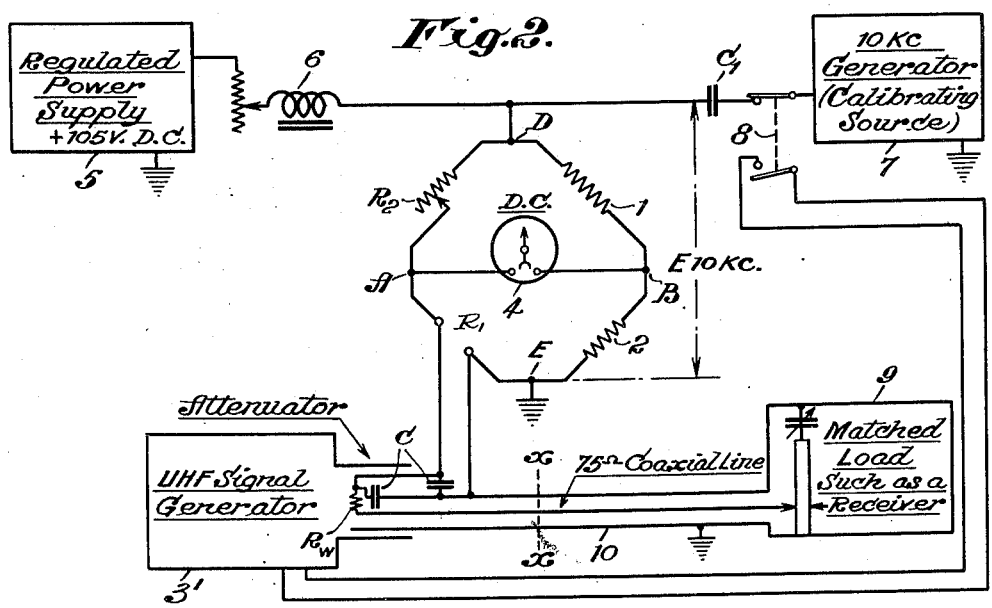

Fig. 2 shows another embodiment of the invention wherein the power from an ultra high frequency signal generator 3' is measured in a Wollaston wire which forms part of the output circuit of that generator. By measuring the power in this Wollaston wire comprising the output or attenuator circuit of the signal generator, the power in a load 9 matched and connected to the signal generator is known to be the same as the power in the terminating resistor $R_w$. The bridge circuit in Fig. 2 is identical with the bridge circuit shown in Fig. 1. The arm $R_1$ in Fig. 2 is here composed of the Wollaston wire $R_w$ having a resistance of nearly 75 ohms, say about 73 ohms at normal room temperature. This wire $R_w$ is a permanent part of the attenuator of the ultra high frequency signal generator 3' and serves also as the mutual inductance coupling loop of the attenuator. It should be noted that whereas in Fig. 1, $R_w$ constituted the signal generator load and resistor R the output attenuator resistor, we have the condition in Fig. 2 where $R_w$ constitutes the output attenuator resistor while a circuit 9 constitutes a matched load such as is obtained by adjusting a receiver for the maximum received power from the signal generator. The attenuator Wollaston wire $R_w$ is connected to the matched load 9 by means of a 75 ohm coaxial line 10. The loop formed by line 10 and matched load 9 is a path having negligible impedance at direct current and at the calibrating frequency from source 7. As previously mentioned, the coupling loop in the attenuator, namely $R_w$, is a piece of platinum wire approximately one-eighth inch long and .1 mil in diameter. The resistance of this wire, which is of the order of 73 ohms at room temperature, will increase somewhat as the instrument warms up in operation. This wire $R_w$ provides a source impedance of nearly 75 ohms having low reactance and it provides a means of measuring the power in or the voltage across the source resistance $R_w$. It will be apparent that the radio frequency voltage across the resistive component of the source impedance $R_w$ is equal to the radio frequency voltage across the resistive component of the load impedance 9 when the latter is matched to take maximum power from the source $R_w$. Likewise, the resistive component of the load impedance 9 is equal to the resistive component of the source impedance $R_w$. These conclusions, of course, assume that the transmission line 10 between the source $R_w$ and the load 9 has negligible loss. Under modified conditions, when load 9 is not perfectly matched to the signal generator 3', the operator must take the inductive reactance of the source $R_w$ into consideration, because this may be around 20 ohms to 30 ohms at 1000 megacycles.

The radio frequency by-pass condensers C across wire $R_w$ have relatively high reactance compared with resistance $R_w$ at frequencies up to 100 kilocycles, which permits accurate calculation of the 10 kilocycle calibrating voltage from source 7 appearing across wire $R_w$. The resistance $R_w$ appears as one arm $R_1$ of the bridge. With the twenty-to-one bridge arms ratio previously mentioned, the decade box $R_2$ is set at 1500 ohms and the direct current in the bridge is adjusted until the bridge is balanced. This makes $R_w$ 75 ohms. By means of the quick change on the switch 8, the signal generator is turned off and the calibrating voltage is applied to the bridge. The calibrating voltage is then adjusted until the bridge is again balanced. Switching from the signal generator to the calibrating voltage will show no change of the resistance $R_w$ when the 10 kilocycle calibrating voltage across $R_w$ is equal to the radio frequency voltage it replaces. It thus follows from what has previously ben given that the 10 kilocycle calibrating voltage across $R_w$ is equal to $$\frac{E_{10kc}}{21}$$

and this is the radio frequency voltage across the 75 ohms resistance component of the load, which is the radio frequency voltage across $R_w$.

In one embodiment of the invention constructed in accordance with Fig. 2 and successfully tried out in practice, frequencies were measured over a range of 600 megacycles to 1200 megacycles with a high degree of accuracy. This range of frequencies is given by way of example only, and is not to be taken as a limiting factor, since higher frequencies may be measured in the same way.

Figure 2A:
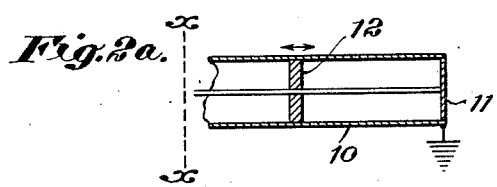
Fig. 2a is a detail showing an element which can be substituted for that portion of Fig. 2 to the right of X—X for the purpose of tuning out the reactance of the Wollaston wire in the signal generator.

Fig. 2a shows a detail in the form of an adjustable concentric line which can take the place of the matched load circuit and that portion of the coaxial line 10 to the right of X, X whenever it is desired to tune out the reactance of the Wollaston wire $R_w$ for the purpose of obtaining a calibration of the output of the ultra high frequency signal generator 3'. If this is done, the voltage measured across $R_w$ is equal to twice the voltage which is delivered to a matched load, as shown in Fig. 2. In Fig. 2a the concentric line is short circuited at one end 11 and also adjustably short circuited by means of a tuning slider or ring 12 over a desired portion of the length of the concentric line 10.

Fig. 3 shows one way in which a Wollaston wire connected in a bridge circuit can be used as a current or voltage indicator at frequencies up to or above several thousand megacycles. The circuit of Fig. 3 comprises a bridge composed of fixed arms 1' and 2', an adjustable arm $R'_2$, and a Wollaston wire $R_w$. A load 13 represents a suitable inductor across which a source of radio frequency voltage is applied. The Wollaston wire $R_w$ is connected to a suitable point on the inductor 13, as shown, for obtaining therefrom a voltage $e$ which is to be indicated in the bridge. A condenser C serves to by-pass the radio frequency energy in the wire $R_w$ to ground. In order to measure the current or voltage, the bridge is first balanced with no radio frequency voltage applied to the inductor 13. The application of radio frequency voltage to the inductor 13 will cause radio frequency current to flow in the Wollaston wire resistance $R_w$ and cause the wire to heat up and its resistance to increase, thus throwing the bridge out of balance and producing a deflection on the microammeter 4'. The sensitivity of this indicator circuit is determined by the resistance 14 in series with the regulated power supply equipment 5. If desired, the circuit of Fig. 3 can be used as a volt or current meter. The deflection on the microammeter, it will be understood, is merely an indication of the relative magnitude of the power in the Wollaston wire $R_w$. In order to use the circuit of Fig. 3 as a volt or current meter, it becomes necessary to calibrate the deflection of the microammeter for known amounts of power measured at low frequencies in $R_w$. This can be done by utilizing a suitable known voltage calibrating source to replace the radio frequency voltage in order to provide the same power in $R_w$ to give the same deflection.

In one embodiment of the invention following the circuit of Fig. 3, successfully tried out in practice, the following constants and results were obtained. The Wollaston wire $R_w$ at room temperature measured approximately 72 ohms. The same wire with 1.2 volts for $e$ measured approximately 100 ohms. The direct current in $R_w$ was approximately 1.4 milliamperes. A microammeter deflection for instrument 4' of 15 microamperes was obtained for the voltage $e$ of 1.26 volts.

Fig. 4 illustrates an improved type of ultra high frequency signal generator tunable over a wide band of frequencies and having as its output circuit an attenuator in the form of fine platinum Wollaston wire $R_w$. This signal generator may be used in the range between 600–1200 megacycles. There is also employed a voltage or current indicator in the form of a Wollaston wire $R'_w$ connected in a bridge circuit in a manner generally similar to that shown in Fig. 3. The signal generator of Fig. 4 comprises a vacuum tube triode 20 whose plate P and grid G are connected at one end to a tunable lecher wire system 21, 22 and at the other end capacitively coupled by means of metallic plates 23, 24 to fixed inductors 25 and 26, respectively. Inductors 25 and 26 are each placed coaxially within separate cylinders. The filament F of the vacuum tube has its legs bypassed together for energy of the operating frequency at the tube by condenser 27. One leg of the filament is connected to a hollow tube 28 grounded at its far end, while the other leg of the filament is connected to a lead extending through the interior of the hollow tube and then to a suitable source of filament heating supply. Sliders 29 serve to tune the plate and grid tuned circuit simultaneously, while the slider 30 serves to tune the filament circuit. A suitable eccentric 31 on a shaft serves as a vernier tuning element for the plate and grid circuits. Suitable polarizing potential for the plate P of the vacuum tube is provided through lead 32 which is connected to one end of the conductor 21.

A low pass filter system 33 having high attenuation over a high range of ultra high frequencies serves to minimize leakage of ultra high frequency energy in the signal generator through the power supply leads. The filter system 33 consists of a pair of coaxial transmission lines 34, 34, wherein the outer conductor is grounded and the inner conductor is by-passed to the outer conductor at predetermined points along its length. It should be noted that a similar filter arrangement 35 consisting of only one coaxial transmission line is shown connected between the Wollaston wire voltage or current indicator R'w and the bridge.

The output circuit or attenuator for the high frequency signal generator of Fig. 4 includes a coupling loop in the form of the Wollaston wire Rw one of whose terminals is connected to the inner conductor 36 of the 75 ohm coaxial line 37, while the other terminal is by-passed by means of condenser 38 to the outer conductor of the line. A lead 39 is brought out from the last mentioned terminal of the Wollaston wire Rw to a point or outside terminal 40 at which it is by-passed by another condenser 41 to the outer conductor of the line 37. A metallic shield surrounds the wire Rw at one end, as shown. It will thus be seen that the Wollaston wire Rw is permanently fixed across the input end of the attenuator cylinder and is energized by inductive coupling with the radio frequency source. The reference voltage indicator takes the form of a bridge 1, 2, R'₂ and R'w together with the microammeter 4 in the manner indicated generally in Fig. 3. It should be noted that the Wollaston wire R'w forms one arm of the bridge, one of whose terminals is tapped on to the inductance 25 to which the attenuator is also coupled. The sensitivity of this reference indicator is determined by the resistance 14 in series with the regulated power supply equipment 5, in the same manner as previously described in connection with Fig. 3.

The operation of the signal generator will be apparent to anyone skilled in the art, except for the features of the Wollaston wire attenuator circuit and the voltage reference indicator whose operation has already been described in connection with other figures.

What is claimed is:

1. The method of measuring power or radio frequency voltage at high frequencies by means of a bridge circuit which includes heating one element of the bridge by the high frequency power or voltage to be measured, balancing said bridge, then substituting for the power to be measured equal power in said element from a known calibrated source of alternating current of a frequency which does not produce a change in heating of said one element over the current cycle, and adjusting the voltage of the known source until the bridge is again balanced.

2. The method of measuring power at frequencies above 100 megacycles by means of a bridge circuit which includes heating one element of the bridge by the high frequency power to be measured, bringing said bridge into balance, then substituting for the power to be measured equal power in said element from a known calibrated source of alternating current of an audio frequency higher than 1000 cycles by an amount which does not produce change in heating of said element over the current cycle, and adjusting the voltage of said known source until the bridge is again balanced.

3. The method of measuring power or radio frequency voltage at high frequencies by means of a bridge circuit which includes heating one element of the bridge by the high frequency power or voltage to be measured, balancing said bridge, then substituting for the power to be measured other power of readily measurable magnitude and adjusting said other power to restore the balance of the bridge, and measuring the amount of the other power.

4. In a high frequency measuring system, a bridge circuit having on one side a pair of fixed resistor arms and on the other side an adjustable resistor arm and another resistor arm adapted to have its resistance change with the flow of current therethrough, a direct current meter connected between the junction point of said pair of arms and the junction point of said other two arms, a variable source of direct current connected to one junction point between the sides of said bridge, and a connection from ground to the other junction point between the sides of the bridge, a high frequency generator whose power is to be measured coupled to said last arm whose resistance is adapted to change with the flow of current therein, a known calibrated source of alternating current of a frequency which does not produce a change in heating of said last arm over the current cycle connected to the same junction point on the bridge to which the source of direct current is connected, and a switch for alternatively operatively associating with said bridge said known source or the generator whose power is to be measured.

5. In a high frequency measuring system, a bridge circuit having on one side a pair of fixed resistor arms and on the other side an adjustable resistor arm and another resistor arm adapted to have its resistance change with the flow of current therethrough, a direct current meter connected between the junction point of said pair of arms and the junction point of said other two arms, a variable source of direct current connected to one junction point between the sides of said bridge, and a connection from ground to the other junction point between the sides of the bridge, a high frequency generator whose power is to be measured coupled to said last arm whose resistance is adapted to change with the flow of current therein, a known calibrated source of alternating current of a frequency which does not produce a change in heating of said last arm over the current cycle capacitively connected to the same junction point on the bridge to which the source of direct current is connected, an impedance connected in the circuit between said same junction point and the source of direct current for enabling said source to present a high impedance to the known calibrated source, and a switch for alternatively operatively associating with said bridge said known source or the generator whose power is to be measured.

6. A system in accordance with claim 5, characterized in this that said resistor arm adapted to have its resistance change with the flow of current therethrough includes a Wollaston wire which forms part of the attenuator circuit of the high frequency generator whose power is to be measured.

7. A system in accordance with claim 5, characterized in this that said resistor arm adapted to have its resistance change with the flow of current therethrough includes a Wollaston wire which is in series relation with and connected by a section of transmission line to another resistor comprising the attenuator circuit of a signal generator constituting the high frequency generator whose power is to be measured.

8. In a high frequency measuring system, a bridge circuit having on one side first and second fixed arms, and on the other side a third adjustable resistor arm and a fourth arm, said fourth arm including a Wollaston wire whose resistance changes with current flow therein, a direct current galvanometer connected between the junction point of said first and second arms and the junction point of said third and fourth arms, an adjustable source of direct current connected to the junction point between said first and third arms, a connection from ground to the junction point between said second and fourth arms, a source of unknown high frequency power coupled to said Wollaston wire for causing high frequency current to flow therethrough, a known calibrated source of alternating current of a frequency which does not produce a change in the heating of the Wollaston wire over the current cycle capacitively coupled to the junction point between said first and third arms, and a switch for alternatively operatively associating with said bridge said unknown source or said known source.

9. In a high frequency measuring system, a bridge circuit having on one side first and second fixed arms, and on the other side a third adjustable resistor arm and a fourth arm, said fourth arm including a Wollaston wire of approximately 75 ohms whose resistance changes with current flow therein and in series relation thereto a resistor of 75 ohms, said Wollaston wire and said resistor of 75 ohms being connected together by a section of low loss transmission line, a direct current galvanometer connected between the junction point of said first and second arms and the junction point of said third and fourth arms, an adjustable source of direct current connected to the junction point between said first and third arms, a connection from ground to the junction point between said second and fourth arms, a generator of unknown power to be measured coupled to said 75 ohm resistor for causing high frequency current to flow through said Wollaston wire in order to heat said Wollaston wire and change its resistance, a known calibrated source of alternating current of a frequency which does not produce a change in the heating of the Wollaston wire over the current cycle capacitively coupled to the junction point between said first and third arms, and a switch for alternatively operatively associating with said bridge said unknown source or said known source.

10. In a high frequency measuring system, a bridge circuit having on one side first and second fixed arms, and on the other side a third adjustable resistor arm and a fourth arm, said fourth arm including a Wollaston wire whose resistance changes with current flow therein, said Wollaston wire forming the output circuit of a signal generator whose power or radio frequency voltage is to be measured, a direct current galvanometer connected between the junction point of said first and second arms and the junction point of said third and fourth arms, an adjustable source of direct current connected to the junction point between said first and third arms, a connection from ground to the junction point between said second and fourth arms, a known calibrated source of alternating current of a frequency which does not produce a change in the heating of the Wollaston wire over the current cycle capacitively coupled to the junction point between said first and third arms, and a switch for alternatively operatively associating with said bridge said unknown source or said known source.

11. In a signal generator of the type including a radio frequency oscillator tunable over a band of frequencies, a fixed inductor element coupled to an electrode of said oscillator, an output circuit for said oscillator comprising a Wollaston wire coupled to said inductor element, a hollow metallic shield surrounding said Wollaston wire near one end of the shield and having an opening in said end for enabling said wire to couple to said inductor element.

12. In an ultra high frequency signal generator of the type including a radio frequency oscillator tunable over a band of frequencies, said oscillator having a tuned circuit for determining the frequency of the signals generated by said oscillator, and also having two inductor elements of uniformly distributed constants, means for shielding said inductor elements from each other, and a voltage attenuator in the form of a thin wire of low reactance to resistance ratio which is adapted to be heated by current flowing therethrough, said wire having the same resistance at radio frequencies as with direct current flowing therethrough and being coupled to one of said inductor elements.

13. In an ultra high frequency signal generator, a vacuum tube oscillator having inductor elements of uniformly distributed constants coupled to each of the grid and anode electrodes, and an attenuator coupled to one of said inductor elements by a loop of wire so thin that its resistance is not substantially greater at the operating frequency than at any lower frequency.

14. A current or voltage indicator comprising a bridge circuit having on one side first and second fixed resistor arms and on the other side an adjustable third arm and a fourth arm, said fourth arm including a wire so thin that its resistance is not substantially greater at the operating frequency than at any lower frequency, a source of adjustable direct current connected to the junction point between said first and third arms for controlling the sensitivity of said indicator, a balance indicator connected between the junction point of said first and second arms and the junction point of said third and fourth arms, a radio frequency by-pass condenser across said fourth arm, and means for applying ultra high frequency current whose magnitude is to be measured to said fourth arm.

15. In combination, an ultra high frequency signal generator comprising a vacuum tube oscillator having an inductor of uniformly distributed constants each coupled to the grid and anode, and an attenuator coupled to one of said inductor elements, said attenuator comprising a wire so thin that its resistance is not substantially greater at the operating frequency than at any lower frequency, and a current or voltage indicator coupled to said one inductor element, said current or voltage indicator comprising a bridge circuit having on one side first and second fixed resistor arms and on the other side an adjustable third arm and a fourth arm, said fourth arm including a wire so thin that its resistance is not substantially greater at the operating frequency than at any lower frequency, a source of adjustable direct current connected to the junction point between said first and third arms for controlling the sensitivity of said indicator, a balance indicator connected between the junction point of said first and second arms and the junction point of said third and fourth arms, and a radio frequency by-pass condenser across said fourth arm.

16. In an ultra high frequency signal generator of the type including a radio frequency electron discharge device oscillator tunable over a band of frequencies, said electron discharge device having a tuned circuit on one side thereof and coupled to the anode and grid electrodes for determining the frequency of the signals generated, and also having two fixed inductor elements of uniformly distributed constants on the other side thereof and capacitively coupled to the anode and grid electrodes, means for shielding said fixed inductor elements from each other, and an output coupling loop in the form of a thin wire of low reactance to resistance ratio which is adapted to be heated by current flowing therethrough, said wire having the same resistance at radio frequencies as with direct current flowing therethrough and being inductively coupled to one of said inductor elements.

17. A signal generator in accordance with claim 16, characterized in this that said wire is a fine platinum wire having a resistance of slightly less than 75 ohms at normal room temperature.

18. The combination with an ultra high frequency signal generator comprising a vacuum tube oscillator whose anode and grid electrodes are individually coupled to fixed inductor elements, and an output coupling loop in the form of a Wollaston wire coupled to one of said inductor elements, said Wollaston wire being so thin that its resistance is not substantially greater at the operating frequency than at any lower frequency, of a voltmeter in the form of a balanced bridge circuit, one arm of said bridge being a Wollaston wire connected to that inductor element which is coupled to said anode.

19. The combination with an ultra high frequency signal generator comprising a vacuum tube oscillator whose anode and grid electrodes are individually coupled to fixed inductor elements, and an output coupling loop in the form of a fine platinum wire coupled to one of said inductor elements, said wire being so thin that its resistance is not substantially greater at the operating frequency than at any lower frequency, of a voltmeter in the form of a bridge circuit, one arm of said bridge being a fine platinum wire connected to the same inductor element to which said other platinum wire is coupled.

20. In an ultra high frequency signal generator of the type including a radio frequency oscillator tunable over a band of frequencies, said oscillator having a tuned circuit for determining the frequency of the signals generated by said oscillator, and also having two inductor elements of uniformly distributed constants, means for shielding said inductor elements from each other, and a voltage attenuator in the form of a thin wire of low reactance to resistance ratio which is adapted to be heated by current flowing therethrough, said wire having the same resistance at radio frequencies as with direct current flowing therethrough and being coupled to one of said inductor elements, a coaxial line the inner conductor of which is connected at one end to one terminal of said wire, and a capacitive connection of low impedance to energy of the operating frequency from the other terminal of said wire to the outer conductor of said line.

21. In a signal generator of the type including a radio frequency oscillator tunable over a band of frequencies, a fixed inductor element coupled to an electrode of said oscillator, and an output circuit for said oscillator comprising a Wollaston wire inductively coupled to said inductor element.

22. In a signal generator of the type including a radio frequency oscillator tunable over a band of frequencies, an inductor element coupled to an electrode of said oscillator, and an output circuit for said oscillator comprising a Wollaston wire inductively coupled to said inductor element.

RALPH W. GEORGE.